H. W. MOWER.
EXPANSION BOLT.
APPLICATION FILED NOV. 14, 1908.
927,064.
Patented July 6, 1909.
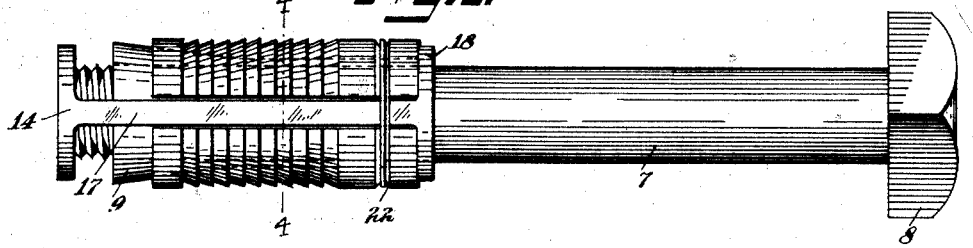
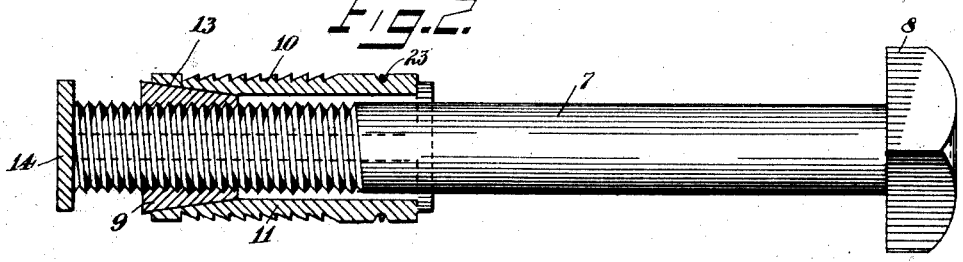
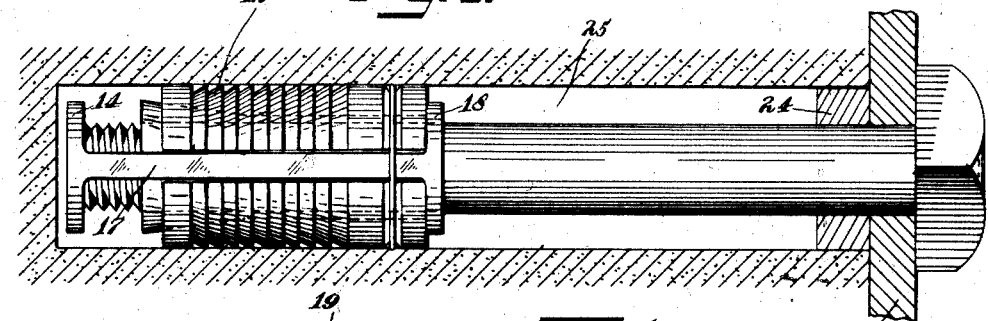
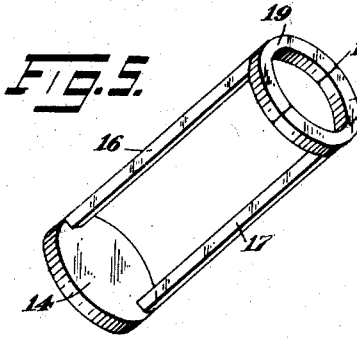
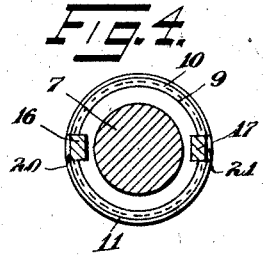
Witnesses:
Inventor:
Herbert W. Mower,
By his Attorney,

UNITED STATES PATENT OFFICE.

HERBERT W. MOWER, OF NEWARK, NEW JERSEY.

EXPANSION-BOLT.

No. 927,064.  Specification of Letters Patent.  Patented July 6, 1909.

Application filed November 14, 1908. Serial No. 462,595.

*To all whom it may concern:*

Be it known that I, HERBERT W. MOWER, a citizen of the United States, residing in Newark, in the county of Essex and State of New Jersey, have invented certain new and useful Improvements in Expansion-Bolts, of which the following is a specification.

This invention relates to expansion bolts, and has for its object to provide means for holding the sectional sleeve in position in an elongated aperture, without the use of spacers, and without directly connecting the sectional sleeve member with the end of the bolt.

In the accompanying drawing representing an embodiment of my invention, Figure 1 is a side elevation of the device. Fig. 2 shows the same in longitudinal section, the bolt being in elevation. Fig. 3 shows the device in position in a wall. Fig. 4 is a section on the line 4—4 indicated in Fig. 1, and Fig. 5 shows the frame member.

Heretofore in the use of expansion bolts for a long bore, where it was not advisable to use a spacer between the sectional sleeve member and the head of the bolt or the article to be locked in position, it has been the practice to provide the sleeve member with an extension engaging the end of the bolt. But this would not leave the sleeve member free to expand. In the present construction a separate member is provided that is engaged by the end of the bolt, while its other end has a free engagement with the outer end of the sleeve sections. This will prevent the outward movement of the sections by the nut member, yet will not interfere in any way with the outward movement of the sections, but will permit their free expansion. In the construction illustrated the bolt 7 having a head 8, is shown provided with the nut member 9. The sleeve member is shown as comprising two sections 10 and 11 having a substantially cylindrical outer surface that may be provided with teeth portions 12 if desired. The bore of the sleeve at one end has a conical portion 13 corresponding with the outer conical surface of the nut, whereby when the bolt draws the nut into the sleeve, it will expand radially outward and retain its cylindrical contour, engaging the bore of the hole throughout its length.

The frame member is shown as comprising a head 14 in the form of a disk that engages the extremity of the bolt 7. At the other end of the frame is a ring portion 15 surrounding the bolt 7 and engaging the outer end portion of the sleeve sections 10 and 11. These two end portions are suitably connected so as not to interfere with the sleeve sections, and the nut member. They are shown as connected by bars 16 and 17, which bars are located between the sleeve sections 10 and 11, permitting longitudinal movement of the frame member without in any way interfering with the expansion of the sleeve sections. If desired the bars 16 and 17 may be integral with the head 14, and the half ring sections 18 and 19 may be formed integral with the respective bars, whereby the frame member can be formed out of a single piece of metal. The nut member 9 is preferably provided with slots 20 and 21 in which freely slide the bars 16 and 17. All of the parts are preferably held together for insertion and removal, by a spring ring 22 fitting in a groove 23 in the sleeve sections. At the outer end of the bore, it is desirable to use a spacing ring or washer 24 of any desired form. In Fig. 3 the bolt is shown as locked in a bore 25 in a wall, clamping an article 26 against the side of the wall. It will be observed that the sleeve sections have expanded away from the bars 16 and 17 as shown in Fig. 1, the free outward movement of the sections at both ends being permitted. In the use of this frame, that is adapted for any form of expansion bolt using sleeve members and a nut with coöperating expanding surfaces, the bolt is inserted in the ring 15 and screwed in the nut, that preferably is slotted on opposite sides to slide on the side bars 16 and 17 of the frame. Then the sleeve portions are placed on the bolt and the ring 22 is applied clamping the members together. When the bolt is inserted in the hole and turned with its head engaging the article to be clamped, the nut will be moved outwardly, and engaging the sleeve with the conical bore, will force the sleeve outward from the bolt to engage the wall of the opening. But this will also have a tendency to force the sleeve portions longitudinally outward or endwise. But the engagement of the sleeves with the ring of the frame, because the frame by its engagement with the end of the bolt is prevented from moving outward, will absolutely prevent the outward endwise movement of the sleeves and therefore they can only expand radially outward from the bolt. It will be observed that while the endwise movement of the sleeves is prevented, they are absolutely free to move radially outward to engage the wall of the bore throughout their entire outer surface, unhindered by any connection with means to prevent their endwise movement.

Having thus described my invention, I claim:

1. In an expansion bolt, the combination with a bolt, a nut, and an expandible sleeve member engaged by the nut, of a frame member having one end portion engaged by the end of the bolt, and having its other end member engaging the outer end of the sleeve member to prevent rearward movement of the sleeve relative to the bolt.

2. In an expansion bolt, the combination with a bolt, a nut, and a sectional sleeve member, of a frame comprising an end portion engaging the end of the bolt, a portion engaging the outer end of the sleeve member, and a connecting portion between said two portions of the frame located between the sleeve sections.

3. In an expansion bolt, the combination with a bolt, of a nut, a sectional sleeve member, a frame comprising an end portion engaging the end of the bolt, a portion engaging the outer end of the sleeve member, and a connecting portion between said two portions of the frame located between the sleeve sections, the nut having longitudinal channels in its outer side in which are located the connecting portions of the frame member.

4. In an expansion bolt, the combination with a bolt, of a nut member, a sectional sleeve member, and a frame member comprising an end portion engaging the end of the bolt, a ring portion slidable on the bolt and engaging the outer end of the sleeve sections, and portions connecting said ring portion and said end portion.

5. In an expansion bolt, the combination with a bolt, of a nut member, a sectional sleeve member, and a frame member comprising an end portion engaging the end of the bolt, a ring portion slidable on the bolt and engaging the outer end of the sleeve sections, and portions connecting said ring portion and said end portions and located between the sleeve sections.

6. In an expansion bolt, the combination with the bolt, of a nut member having external grooves, a sectional sleeve member, and a frame member comprising an end portion adapted to engage the end of the bolt, a ring portion slidable on the bolt and engaging the outer end of the sleeve sections, and portions connecting said ring and said end portion and located between the sleeve sections, the connecting portions of the frame member being located in the grooves of the nut member.

7. In an expansion bolt, the combination with a bolt, a nut, and an expandible sleeve member engaged by the nut, of a frame member having one end portion engaging the end of the bolt, and having its other end portion engaging the sleeve member to prevent rearward movement of the sleeve relative to the bolt.

8. In an expansion bolt, the combination with a bolt, of a nut, a sectional sleeve member, a frame comprising an end portion engaging the end of the bolt, a portion engaging the sleeve member, to prevent endwise movement thereof, and a connecting portion between said two portions of the frame located between the sleeve sections.

9. A device of the character described, comprising a pair of comparatively narrow bars of substantially uniform width extending parallel and connected at one end by a transverse abutment portion for engagement with the end of a bolt, each of the bars having at its other end a transverse portion with a flattened face extending circumferentially.

HERBERT W. MOWER.

Witnesses:
WILLIAM H. REID,
C. A. WEED.